United States Patent
Gao

(10) Patent No.: US 11,587,486 B2
(45) Date of Patent: Feb. 21, 2023

(54) DISPLAY DEVICE, DRIVING METHOD THEREOF, AND DISPLAY SYSTEM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventor: Feng Gao, Beijing (CN)

(73) Assignees: Beijing BOE Optoelectronics Technology Co., LTD., Beijing (CN); BOE Technology Group Co., LTD., Beijing (CN)

( * ) Notice: Subject to any disclaimer, the term of this patent is extended or adjusted under 35 U.S.C. 154(b) by 0 days.

(21) Appl. No.: 17/361,409

(22) Filed: Jun. 29, 2021

(65) Prior Publication Data
US 2022/0157214 A1  May 19, 2022

(30) Foreign Application Priority Data
Nov. 18, 2020 (CN) .......................... 202011293687.4

(51) Int. Cl.
G09G 3/20 (2006.01)
H04N 5/225 (2006.01)
H04N 5/232 (2006.01)

(52) U.S. Cl.
CPC ........... *G09G 3/20* (2013.01); *H04N 5/22525* (2018.08); *H04N 5/23222* (2013.01); *G09G 2330/021* (2013.01)

(58) Field of Classification Search
None
See application file for complete search history.

(56) References Cited

U.S. PATENT DOCUMENTS

2004/0049705 A1* 3/2004 Liebenow ............. G06F 1/3218
713/320
2006/0146043 A1 7/2006 Tseng et al.
(Continued)

FOREIGN PATENT DOCUMENTS

CN 1759430 A 4/2006
CN 103105684 A 5/2013
(Continued)

OTHER PUBLICATIONS

English translation of WO 2018058902 A1, An et al, Apr. 5, 2018 (Year: 2018).*
(Continued)

*Primary Examiner* — James M Hannett
(74) *Attorney, Agent, or Firm* — Fay Sharpe LLP

(57) ABSTRACT

A display device includes a control circuit and a driving circuit driving a display panel to display an image. In response to determining that the driving circuit is to be switched from a running state to a standby state, the control circuit stops supplying power to the driving circuit. In response to determining that the driving circuit is to be switched from the standby state to the running state, the control circuit resumes the power supply to the driving circuit, and transmits a target reset signal to the driving circuit. The target reset signal is the same as a reset signal sent by a host computer to the driving circuit in response to a coupling being established between the driving circuit and the host computer.

20 Claims, 5 Drawing Sheets

(56) References Cited

U.S. PATENT DOCUMENTS

| | | |
|---|---|---|
| 2006/0152460 A1 | 7/2006 | Toyozawa et al. |
| 2010/0327960 A1 | 12/2010 | Huber et al. |
| 2015/0271753 A1* | 9/2015 | Matsuda .......... H04W 52/0219 |
| | | 370/311 |
| 2018/0301109 A1 | 10/2018 | Liu et al. |

FOREIGN PATENT DOCUMENTS

| | | |
|---|---|---|
| CN | 106383611 A | 2/2017 |
| CN | 111429833 A | 7/2020 |
| JP | 2006136100 A | 5/2006 |
| TW | 201327523 A | 7/2013 |
| WO | WO-2018058902 A1 * | 4/2018 .............. G06F 1/26 |

OTHER PUBLICATIONS

China National Intellectual Property Administration, First office action of Chinese application No. 202011293687.4 dated Dec. 8, 2022, which is foreign counterpart application of this US application.

* cited by examiner

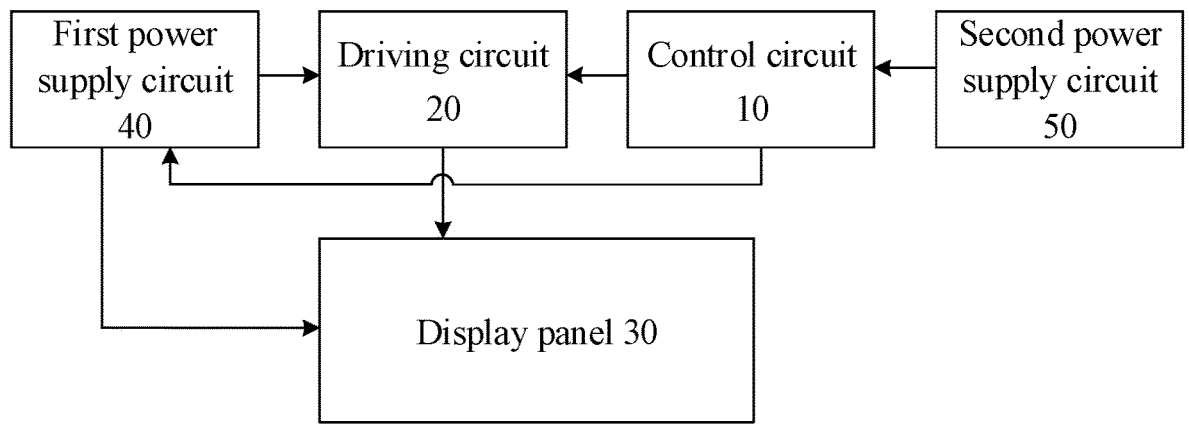

FIG. 3

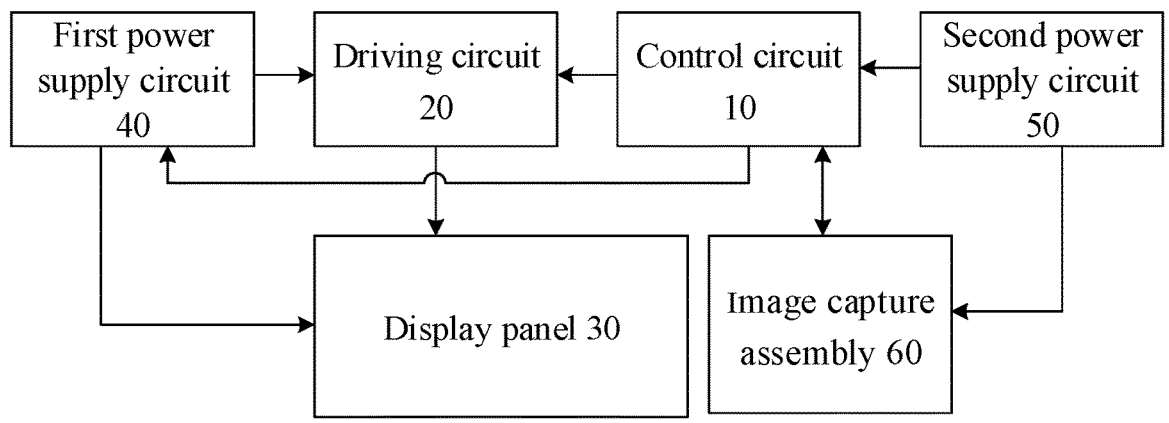

FIG. 4

In response to determining that a driving circuit is to be switched from a running state to a standby state, stopping transmitting a first power supply signal to the driving circuit ⸺ 501

In response to determining that the driving circuit is to be switched from the standby state to the running state, resuming transmitting the first power supply signal to the driving circuit, and transmitting a target reset signal to the driving circuit ⸺ 502

FIG. 5

DISPLAY DEVICE, DRIVING METHOD THEREOF, AND DISPLAY SYSTEM

This application is based on and claims priority to the Chinese Patent Application No. 202011293687.4, filed on Nov. 18, 2020 and entitled "DISPLAY DEVICE, DRIVING METHOD THEREOF, AND DISPLAY SYSTEM," the disclosure of which is incorporated herein by reference in its entirety.

TECHNICAL FIELD

The present disclosure relates to the field of display technologies, and in particular relates to a display device, a driving method thereof, and a display system.

BACKGROUND

An augmented reality (AR) display device is a device that can superimpose a real environment and a virtual object in one picture to be displayed to a user, and content displayed by the AR display device usually comes from a host computer such as a mobile phone or a computer.

In the related art, the AR display device usually includes a driving circuit and a display panel coupled to each other. The AR display device may be coupled to the host computer by the driving circuit. When the image data is delivered by the host computer, the driving circuit can drive, based on the image data, the display panel to display an image.

SUMMARY

Embodiments of the present disclosure provide a display device, a driving method thereof, and a display system.

In one aspect, a display device is provided. The display device includes a control circuit, a driving circuit, and a display panel; wherein the control circuit is coupled to the driving circuit, and is configured to stop transmitting a first power supply signal to the driving circuit in response to determining that the driving circuit is to be switched from a running state to a standby state, and resume transmitting the first power supply to the driving circuit in response to determining determined that the driving circuit is to be switched from the standby state to the running state, and transmit a target reset signal to the driving circuit; and the driving circuit is further coupled to the display panel, and is configured to be coupled to a host computer; and the driving circuit is configured to be initialized in response to the target reset signal, and drive, based on first image data delivered by the host computer, the display panel to display an image under driving by the first power supply signal, wherein the target reset signal is the same as an initial reset signal, and the initial reset signal is a signal sent by the host computer to the driving circuit in response to a coupling being established between the driving circuit and the host computer.

In some embodiments, the display device further includes a first power supply circuit; wherein the control circuit is further coupled to the first power supply circuit, and is configured to transmit a disable signal to the first power supply circuit in response to determining that the driving circuit is to be switched from the running state to the standby state, and transmit an enable signal to the first power supply circuit in response to determining that the driving circuit is to be switched from the standby state to the running state; and the first power supply circuit is further coupled to the driving circuit, and is configured to stop transmitting the first power supply signal to the driving circuit in response to the disable signal, and transmit the first power supply signal to the driving circuit in response to the enable signal.

In some embodiments, the first power supply circuit is further coupled to the display panel, and is further configured to stop transmitting the first power supply signal to the display panel in response to the disable signal, and transmit the first power supply signal to the display panel in response to the enable signal.

In some embodiments, the control circuit is further configured to switch to a low power consumption mode in response to determining that the driving circuit is to be switched from the running state to the standby state;

wherein in the low power consumption mode, the control circuit does not communicate with the driving circuit.

In some embodiments, the control circuit is further configured to exit the low power consumption mode in response to determining that the driving circuit is to be switched from the standby state to the running state.

In some embodiments, the control circuit is further coupled to the host computer; and the control circuit is further configured to determine that the driving circuit is to be switched from the running state to the standby state in response to detecting that a screen-off duration of the host computer is greater than a duration threshold, and determine that the driving circuit is to be switched from the standby state to the running state in response to detecting that the host computer delivers the first image data again in the standby state.

In some embodiments, the control circuit is further coupled to the host computer; and the control circuit is further configured to determine that the driving circuit is to be switched from the running state to the standby state in response to detecting a touch operation on a sleep control on the host computer.

In some embodiments, the control circuit includes a general-purpose input/output (GIPO) pin, wherein the control circuit is coupled to the driving circuit by the GIPO pin, and the target reset signal is transmitted to the driving circuit by the GIPO pin.

In some embodiments, the display device further includes a second power supply circuit; wherein the second power supply circuit is coupled to the control circuit, and is configured to supply a second power supply signal to the control circuit, and the control circuit is configured to operate under driving by the second power supply signal.

In some embodiments, the display device further includes an image capture assembly; wherein the second power supply circuit is further coupled to the image capture assembly, and is further configured to supply the second power supply signal to the image capture assembly;

the image capture assembly is further coupled to the control circuit, and is configured to capture a second image data under driving by the second power supply signal, and transmit the second image data to the driving circuit by the control circuit; and the driving circuit is configured to drive, based on the first image data and the second image data, the display panel to display an image.

In some embodiments, the control circuit is a micro controller unit (MCU).

In some embodiments, the display device is an AR device.

In another aspect, a driving method of a display device is provided, applicable to a control circuit of the display device in the above aspect. The method includes:

in response to determining that a driving circuit is to be switched from a running state to a standby state, stopping transmitting a first power supply signal to the driving circuit; and in response to determining that the driving circuit is to be switched from the standby state to the running state, resuming transmitting the first power supply signal to the driving circuit, and transmitting a target reset signal to the driving circuit, wherein the target reset signal is intended to instruct the driving circuit to be initialized, and the first power supply signal is intended to instruct the driving circuit to drive, based on first image data delivered by a host computer, a display panel to display an image;

wherein the target reset signal is the same as an initial reset signal, and the initial reset signal is a signal sent by the host computer to the driving circuit in response to a coupling being established between the driving circuit and the host computer.

In some embodiments, stopping transmitting the first power supply signal to the driving circuit includes:

in response to determining that the driving circuit is to be switched from the running state to the standby state, transmitting a disable signal to a first power supply circuit, wherein the disable signal is intended to instruct the first power supply circuit to stop transmitting the first power supply signal to the driving circuit; and in response to determining that the driving circuit is to be switched from the standby state to the running state, resuming transmitting the first power supply signal to the driving circuit includes:

in response to determining that the driving circuit is to be switched from the standby state to the running state, transmitting an enable signal to the first power supply circuit, wherein the enable signal is intended to instruct the first power supply circuit to transmit the first power supply signal to the driving circuit.

In some embodiments, the method further includes:

in response to determining that the driving circuit is to be switched from the running state to the standby state, upon stopping transmitting the first power supply signal to the driving circuit, switching to a low power consumption mode;

wherein in the low power consumption mode, the control circuit does not communicate with the driving circuit.

In some embodiments, the method further includes:

in response to determining that the driving circuit is to be switched from the standby state to the running state, prior to resuming transmitting the first power supply signal to the driving circuit, exiting the low power consumption mode.

In still another aspect, a display system is provided. The display system includes a host computer and a display device, wherein the display device includes a control circuit, a driving circuit, and a display panel; wherein the host computer is coupled to the driving circuit, and is configured to deliver image data to the driving circuit;

the control circuit is coupled to the driving circuit, and is configured to stop transmitting a first power supply signal to the driving circuit in response to determining that the driving circuit is to be switched from a running state to a standby state, resume transmitting the first power supply signal to the driving circuit in response to determining that the driving circuit is to be switched from the standby state to the running state, and transmit a target reset signal to the driving circuit; and the driving circuit is further coupled to the display panel, and is configured to be initialized in response to the target reset signal, and drive, based on the image data delivered by the host computer, the display panel to display an image under driving by the first power supply signal;

wherein the target reset signal is the same as an initial reset signal, and the initial reset signal is a signal sent by the host computer to the driving circuit in response to a coupling being established between the driving circuit and the host computer.

In some embodiments, the host computer is further coupled to the control circuit, a first power supply circuit, and a second power supply circuit in the display device;

wherein the host computer is configured to communicate with the control circuit to supply an initial power supply signal to the first power supply circuit and the second power supply circuit; and the first power supply circuit is configured to generate the first power supply signal based on the initial power supply signal, and the second power supply circuit is configured to generate a second power supply signal based on the initial power supply signal.

In some embodiments, the host computer is a mobile phone.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and other drawings may be derived by persons of ordinary skill in the art from these accompanying drawings without creative efforts.

FIG. 3 is a schematic structural diagram of still another display device according to an embodiment of the present disclosure;

FIG. 4 is a schematic structural diagram of still another display device according to an embodiment of the present disclosure;

FIG. 5 is a flowchart of a driving method of a display device according to an embodiment of the present disclosure;

DETAILED DESCRIPTION

For clearer descriptions of the objectives, technical solutions, and advantages of the present disclosure, embodiments of the present disclosure are described in detail hereinafter with reference to the accompanying drawings.

The AR technology is a new technology that can facilitate the "seamless" integration of real world information (i.e., a real environment) and virtual world information (i.e., a virtual environment). As an important carrier of the AR technology, AR display devices (for example, AR glasses) have achieved significant progress in recent years, and are widely applied in various fields, such as security, education, medical care, advertisement, exhibition, and the like. In addition, most AR display devices are passive display devices, and content displayed by AR display devices usually comes from host computers such as mobile phones or personal computers (PC). Moreover, a driving circuit configured to control the display of a display panel in the AR display device functions for a long time. As long as the image data is delivered by the host computer, the driving circuit immediately drives the display panel to display an image, leading to higher power consumption. As a result, the AR display device is subjected to a heavy burden in terms of battery life and heat dissipation, affecting user experience.

At present, in order to reduce the power consumption of the AR display device, only a power supply for the driving circuit is usually controlled directly to enable the driving circuit to sleep when the driving circuit is not required to operate. However, as the driving circuit imposes a stricter initialization timing requirement, when the driving circuit is to be switched from a sleep state to the running state, the control method may easily cause the driving circuit to fail to be reliably and effectively initialized. That is, the driving circuit cannot reliably enter the running state again. In this case, the display panel further cannot be lit again, and the AR display device has lower operation stability.

An embodiment of the present disclosure provides a new display device. In the display device, the driving circuit not only can enter a sleep state to sleep at a moment when the driving circuit is not required to operate, but also can be reliably and effectively initialized when the driving circuit is switched from the sleep state to the running state. That is, the driving circuit can be stably woken up to operate. The display device has higher operation stability and lower power consumption, thereby effectively improving user experience. In addition, no additional component is added to the display device, little change is made to hardware and software, the costs are lower, and a mass production requirement can be met.

Figure 1:
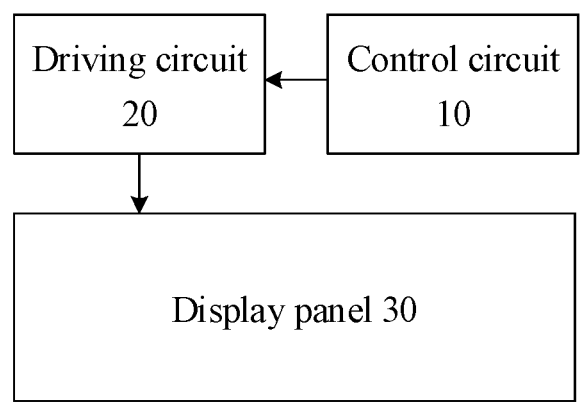
FIG. 1 is a schematic structural diagram of a display device according to an embodiment of the present disclosure.

FIG. 1 is a schematic structural diagram of a display device according to an embodiment of the present disclosure. As shown in FIG. 1, the display device includes a control circuit 10, a driving circuit 20, and a display panel 30.

The control circuit 10 is coupled (i.e., electrically connected) to the driving circuit 20. The driving circuit 20 may be further coupled to the display panel 30, and may be further coupled to a host computer (not shown in FIG. 1).

The control circuit 10 is configured to stop transmitting a first power supply signal to the driving circuit 20, i.e., to cut off the power supply to the driving circuit 20, in response to determining that the driving circuit 20 is to be switched from a running state (i.e., a normal operating state) to a standby state (i.e. a non-operating or sleep state).

The control circuit 10 is configured to resume transmitting the first power supply signal to the driving circuit 20 in response to determining that the driving circuit 20 is to be switched from the standby state to the running state, that is, resume the power supply to the driving circuit 20, and transmit a target reset signal to the driving circuit 20.

Where the control circuit 10 stops transmitting the first power supply signal to the driving circuit 20, the driving circuit 20 may reliably enter the standby state for sleep. In this case, the operating power consumption of the display device is reliably reduced.

Where the control circuit 10 resumes transmitting the first power supply signal to the driving circuit 20 and transmits the target reset signal to the driving circuit 20, the driving circuit 20 may be configured to be initialized in response to the target reset signal, and may drive, based on first image data delivered by the host computer, the display panel 30 to display an image under driving by the first power supply signal. That is, the driving circuit 20 may sequentially complete an initialization procedure and be woken up to return to the running state to operate normally based on the received target reset signal and the first power supply signal.

The target reset signal is the same as an initial reset signal, and the initial reset signal is a signal sent by the host computer to the driving circuit 20 in response to a coupling being established between the driving circuit 20 and the host computer. In this case, when the driving circuit 20 receives the target reset signal, it is recognized that the coupling with the host computer has been reestablished, and then the initialization procedure is performed according to a state in which the coupling with the host computer is established, and the driving circuit 20 enters the running state. That is, the control circuit 10 sends the target reset signal to the driving circuit 20, which is in fact equivalent to simulating a process of establishing the coupling between the driving circuit 20 and the host computer. In response to the coupling being established between the driving circuit 20 and the host computer, the driving circuit 20 can usually reliably complete initialization and drive the display panel 30 to display an image. Therefore, the driving circuit 20 can reliably complete the initialization procedure to enter a normal running state again by transmitting the target reset signal to the driving circuit 20, that is, to ensure stable switching of the driving circuit 20 from the standby state to the running state.

In some embodiments, the coupling may be established between the driving circuit 20 and the host computer by a cable (for example, Type C). Correspondingly, the target reset signal transmitted to the driving circuit 20 in fact may indicate that the driving circuit 20 determines that the cable establishing a coupling between the driving circuit 20 and the host computer is re-plugged once.

In some embodiments, the driving circuit 20 is a circuit that is bridged between the host computer and the display panel 30 for controlling the display panel 30 to display an image based on image data delivered by the host computer. Therefore, the driving circuit 20 may also be referred to as a bridge integrated circuit (bridge IC).

In summary, the embodiment of the present disclosure provides a display device. The display device includes a control circuit and a driving circuit driving a display panel to display. In response to determining that the driving circuit is to be switched from a running state to a standby state, the control circuit stops supplying power to the driving circuit, to ensure that the driving circuit reliably enters the standby state, and the display panel stops displaying the image. In response to determining that the driving circuit is to be switched from the standby state to the running state, the control circuit resumes power supply to the driving circuit, and transmits a target reset signal to the driving circuit. The target reset signal is the same as a reset signal sent by a host computer to the driving circuit in response to a coupling being established between the driving circuit and the host computer. Therefore, it is ensured that the driving circuit stably enters the running state upon reliable initialization of the driving circuit, and the display panel resumes normal display. The display device has higher operation stability and lower operating power consumption.

In some embodiments, for reliable detection of switching of an operation state of the driving circuit 20, the control circuit 10 according to the embodiment of the present disclosure may be further configured to be coupled to the host computer.

In some embodiments, the control circuit 10 may be further configured to determine that the driving circuit 20 is to be switched from the running state to the standby state in response to detecting that a screen-off duration of the host computer is greater than a duration threshold. That is, during a process that the driving circuit 20 is in a normal running state, in response to determining that the screen of the host computer is off, the control circuit 10 may reliably determine, based on the screen-off duration of the host computer, whether the driving circuit 20 needs to enter sleep, that is, whether the driving circuit 20 is to be switched from the running state to the standby state. The duration threshold may be a fixed value preset in the control circuit 10.

In some embodiments, it is assumed that the duration threshold is 3 seconds in response to detecting that the screen-off duration of the host computer is 4 seconds, which is greater than 3 seconds, it may be determined that the driving circuit 20 is to be switched from the running state to the standby state. In comparison, in response to detecting that the screen-off duration of the host computer is 1 second, which is less than 3 seconds, it may be determined that the driving circuit 20 is not to be switched from the running state to the standby state.

In some embodiments, the control circuit 10 may be further configured to determine that the driving circuit 20 is to be switched from the standby state to the running state in response to detecting that the host computer delivers the first image data again in the standby state. That is, when the driving circuit 20 is in a sleep state, the control circuit 10 may reliably determine, based on an image data delivery operation of the host computer, whether the driving circuit 20 needs to be woken up, that is, whether the driving circuit 20 is to be switched from the standby state to the running state.

It should be noted that described above is an optional implementation that the control circuit 10 determines the switching of the operation state of the driving circuit 20, any method that can determine the switching of the operation state of the driving circuit may be applicable to the embodiment of the present disclosure. For example, the host computer may have a sleep control, and when the control detects a touch operation on the sleep control, the control circuit 10 may determine that the driving circuit 20 is to be switched from the running state to the standby state.

In some embodiments, in the embodiment of the present disclosure, the control circuit 10 may be further configured to switch to a low power consumption mode in response to determining that the driving circuit 20 is to be switched from the running state to the standby state. Correspondingly, the control circuit 10 may be further configured to exit the low power consumption mode in response to determining that the driving circuit 20 is to be switched from the standby state to the running state. The low power consumption mode may be an operation mode prewritten into the control circuit 10.

In the low power consumption mode, the control circuit 10 may not communicate with the driving circuit 20. For example, when the control circuit 10 is further configured to be coupled to the host computer, in the low power consumption mode, the control circuit 10 may only communicate with the host computer. In this case, the operating power consumption of the display device can be further reduced.

It should be noted that the control circuit 10 stops transmitting the first power supply signal to the driving circuit 20 and enters the low power consumption mode in a chronological order. That is, in response to determining that the driving circuit 20 is to be switched from the running state to the standby state, the control circuit 10 may first cut off the power supply to the driving circuit 20, and then enters the low power consumption mode. The control circuit 10 exiting the low power consumption mode and resuming transmitting the first power supply signal to the driving circuit 20 may be performed in a chronological order. That is, in response to determining that the driving circuit 20 is to be switched from the standby state to the running state, the control circuit 10 may first exit the low power consumption mode and then restore the power supply to the driving circuit 20.

Figure 2:
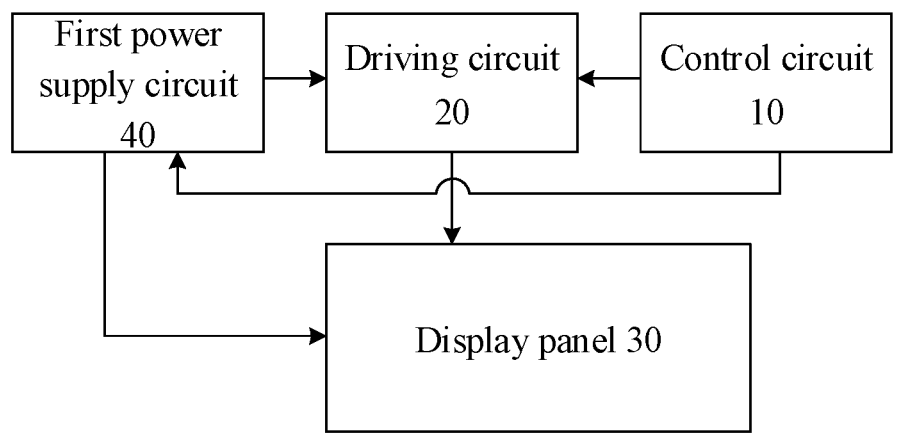
FIG. 2 is a schematic structural diagram of another display device according to an embodiment of the present disclosure.

In some embodiments, FIG. 2 is a schematic structural diagram of another display device according to an embodiment of the present disclosure. As shown in FIG. 2, the display device may further include a first power supply circuit 40.

The control circuit 10 may be further coupled to the first power supply circuit 40. The control circuit 10 may be configured to transmit a disable signal to the first power supply circuit 40 in response to determining that the driving circuit 20 is to be switched from a running state to a standby state, and transmit an enable signal to the first power supply circuit 40 in response to determining that the driving circuit 20 is to be switched from the standby state to the running state.

In some embodiments, the first power supply circuit 40 may have a power supply enable pin Power_EN. The control circuit 10 transmitting the disable signal to the first power supply circuit 40 may indicate that the control circuit 10 pulls down a potential of Power_EN. The control circuit 10 transmitting the enable signal to the first power supply circuit 40 may indicate that the control circuit 10 pulls up the potential of Power_EN. The pulling down potential and the pulling up potential are relative concepts.

The first power supply circuit 40 may be further coupled to the driving circuit 20. The first power supply circuit 40 may be configured to stop transmitting the first power supply signal to the driving circuit 20 in response to the disable signal, and transmit the first power supply signal to the driving circuit 20 in response to the enable signal.

In some embodiments, in response to receiving the disable signal, the first power supply circuit 40 may stop transmitting the first power supply signal to the driving circuit 20, under control of the disable signal, that is, stop supplying power to the driving circuit 20. In this case, the driving circuit 20 cannot run normally, and enters the standby state. Similarly, in response to receiving the enable signal, the first power supply circuit 40 may resume transmitting the first power supply signal to the driving circuit 20, under control of the enable signal, that is, continue supplying power to the driving circuit 20. In this case, the driving circuit 20 may be woken up and enter a normal running state again.

It can be learned based on the disclosure of the above embodiment that a fashion in which the control circuit 10 is configured to stop transmitting the first power supply signal to the driving circuit 20 may be as follows: The control circuit 10 controls the first power supply circuit 40 that supplies power to the driving circuit 20 to stop transmitting the first power supply signal to the driving circuit 20, that is, cut off the power supply to the driving circuit 20. A fashion in which the control circuit 10 is configured to resume transmitting the first power supply signal to the driving circuit 20 may be as follows: The control circuit 10 controls the first power supply circuit 40 that supplies power to the driving circuit 20 to continue transmitting the first power supply signal to the driving circuit 20, that is, resume the power supply to the driving circuit 20.

In some embodiments, still referring to FIG. 2, the first power supply circuit 40 may be further coupled to the display panel 30. The first power supply circuit 40 may be further configured to stop transmitting the first power supply signal to the display panel 30 in response to the received disable signal, and transmit the first power supply signal to the display panel 30 in response to the received enable signal. That is, the first power supply circuit 40 may be further configured to supply power to the display panel 30. The display panel 30 may operate reliably in response to the received first power supply signal, for example, normally displaying an image.

In some embodiments, FIG. 3 is a schematic structural diagram of still another display device according to an embodiment of the present disclosure. As shown in FIG. 3, the display device may further include a second power supply circuit 50.

The second power supply circuit 50 may be coupled to the control circuit 10. The second power supply circuit 50 may be configured to supply a second power supply signal to the control circuit 10. The control circuit 10 may be configured to operate driven by the second power supply signal, such as implementing functions implemented in the above embodiment. That is, the display device further includes a power supply circuit specially configured to supply power to the control circuit 10.

Different power supply circuits are disposed to supply power to the driving circuit 20 and the control circuit 10, such that the operation reliability of the driving circuit 20 and the control circuit 10 can be ensured.

In some embodiments, FIG. 4 is a schematic structural diagram of still another display device according to an embodiment of the present disclosure. As shown in FIG. 4, the display device may further include an image capture assembly 60. For example, the image capture assembly 60 may be a camera. The second power supply circuit 50 may be further coupled to the image capture assembly 60. The image capture assembly 60 may be further coupled to the control circuit 10.

The second power supply circuit 50 may be further configured to supply a second power supply signal to the image capture assembly 60. That is, the second power supply circuit 50 may be further configured to supply power to the image capture assembly 60.

The image capture assembly 60 may be further configured to capture second image data driven by the second power supply signal and transmit the second image data to the driving circuit 20 by the control circuit 10. Correspondingly, the driving circuit 20 may be configured to drive, based on the first image data and the second image data, the display panel 30 to display an image.

In some embodiments, the captured second image data may be transmitted to the control circuit 10 by the image capture assembly 60, and then transmitted to a coupled host computer by the control circuit 10. Then, the host computer may deliver the second image data to the coupled driving circuit 20, such that the driving circuit 20 drives, based on the received first image data and second image data, the display panel 30 to display an image.

By further disposing the image capture assembly 60, a solid foundation is laid for the implementation of AR technology. That is, the display device according to the embodiment of the present disclosure may be an AR device. Image data captured by the image capture assembly 60 may be used as original materials for the AR device to implement some functions (for example, human face recognition or ranging). In this case, the interactivity between the AR device and the real world can be enhanced.

In some embodiments, the control circuit 10 according to the embodiment of the present disclosure may be a micro controller unit (MCU). Because the MCU has a larger number of pins, the MCU may be fully configured to implement state detection and control of functional modules inside the display device. That is, optional functions implemented in the above embodiment can be reliably implemented by using the MCU as the control circuit 10.

In some embodiments, the control circuit 10 may include a GIPO pin. The control circuit 10 may be coupled to the driving circuit 20 by the GIPO pin, and transmit a target reset signal to the driving circuit 20 by the GIPO pin.

In summary, the embodiment of the present disclosure provides a display device. The display device includes a control circuit and a driving circuit driving a display panel to display. In response to determining that the driving circuit is to be switched from a running state to a standby state, the control circuit stops supplying power to the driving circuit, to ensure that the driving circuit reliably enters the standby state, and the display panel stops displaying the image. In response to determining that the driving circuit is to be switched from the standby state to the running state, the control circuit resumes power supply to the driving circuit, and transmits a target reset signal to the driving circuit. The target reset signal is the same as a reset signal sent by a host computer to the driving circuit in response to a coupling being established between the driving circuit and the host computer. Therefore, it is ensured that the driving circuit stably enters the running state upon reliable initialization of the driving circuit, and the display panel resumes normal display. The display device has higher operation stability and lower operating power consumption.

FIG. 5 is a flowchart of a driving method of a display device according to an embodiment of the present disclosure. The method may be applicable to the control circuit 10 in the display device shown in any one of FIG. 1 to FIG. 4. As shown in FIG. 5, the method may include the following steps.

In step 501, in response to determining that a driving circuit is to be switched from a running state to a standby state, transmitting a first power supply signal to the driving circuit is stopped.

In step 502, in response to determining that the driving circuit is to be switched from the standby state to the running state, transmitting the first power supply signal to the driving circuit is resumed, and a target reset signal is transmitted to the driving circuit.

The target reset signal may be intended to instruct the driving circuit to be initialized. The first power supply signal may be intended to instruct the driving circuit to drive, based on first image data delivered by a host computer, a display panel to display an image. That is, the driving circuit may complete initialization in response to the received target reset signal, and may drive, based on the first image data, the display panel to display an image under driving by the received first power supply signal.

In the embodiment of the present disclosure, the target reset signal may be the same as an initial reset signal, and the initial reset signal may be a signal sent by the host computer to the driving circuit in response to a coupling being established between the driving circuit and the host computer. In this case, based on the disclosure of the embodiment of the display device side shown in any one of FIG. 1 to FIG. 4, a stable switching of the driving circuit from the standby state to the running state can be ensured.

Figure 6:
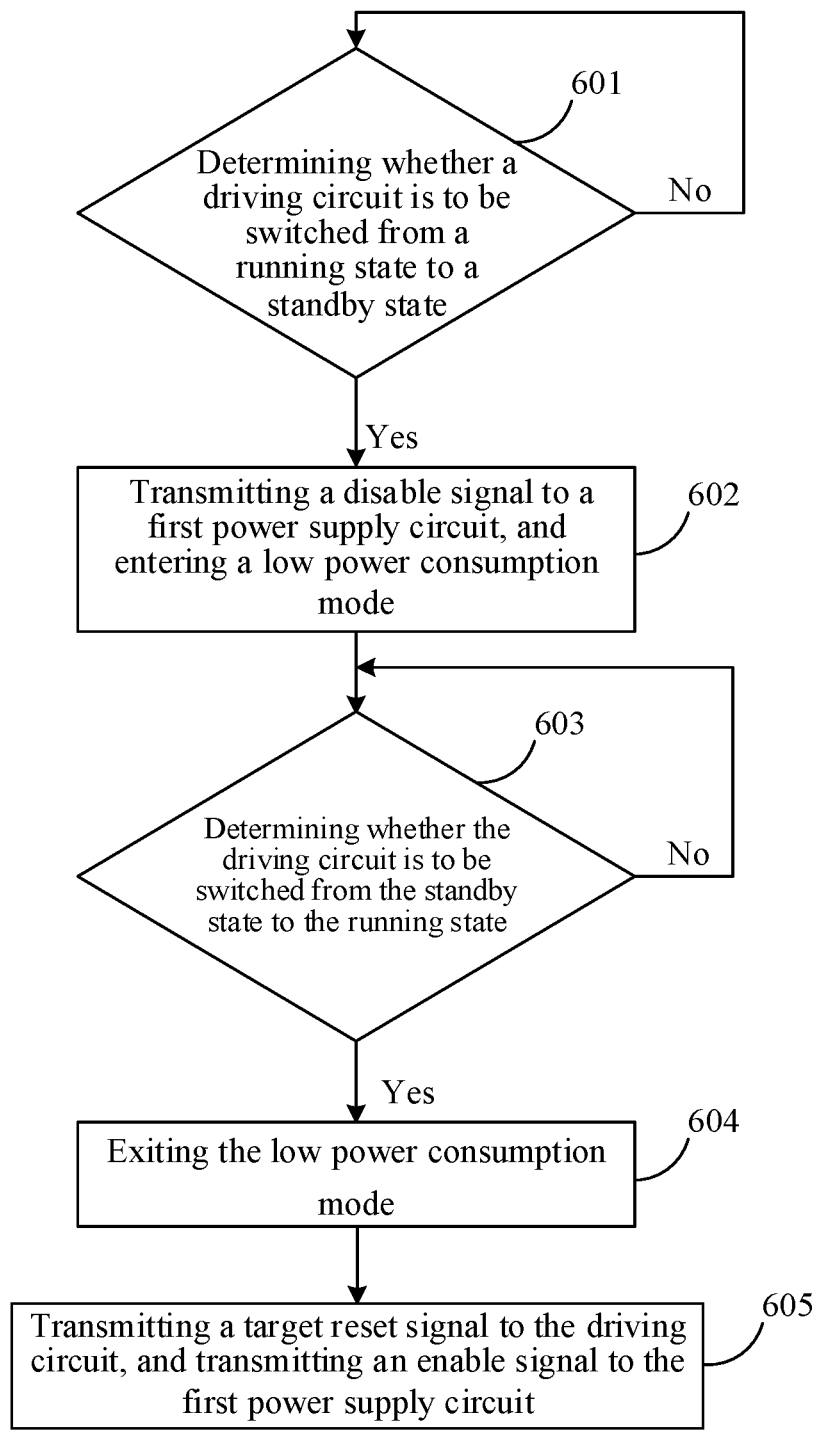
FIG. 6 is a flowchart of another driving method of a display device according to an embodiment of the present disclosure.

In some embodiments, with reference to the display device shown in FIG. 4, FIG. 6 is a flowchart of another driving method of a display device. The method may be applicable to the control circuit 10. As shown in FIG. 6, the method may include the following steps.

In step 601, whether a driving circuit is to be switched from a running state to a standby state is determined.

In some embodiments, as disclosed in the embodiment of the device side, the control circuit may determine whether the driving circuit is to be switched from the running state to the standby state by detecting a screen-off duration of a host computer.

For example, in response to detecting that the screen-off duration of the host computer is greater than a duration threshold, the control circuit may determine that the driving circuit is to be switched from the running state to the standby state. By this time, the control circuit may continue to perform the following step 602. In response to detecting that the screen-off duration of the host computer is less than or equal to the duration threshold, the control circuit may determine that the driving circuit is not to be switched from the running state to the standby state. By this time, the control circuit may continue to perform step 601.

In step 602, a disable signal is transmitted to a first power supply circuit, and a low power consumption mode is entered.

For example, in response to determining that the driving circuit is to be switched from the running state to the standby state, the control circuit may first pull down an enable pin Power_EN of the first power supply circuit, and then enter the low power consumption mode. By this time, the first power supply circuit may stop supplying power to the driving circuit in response to the disable signal, and the driving circuit enters the standby state. By this time, the control circuit may only communicate with the host computer.

In step 603, whether the driving circuit is to be switched from the standby state to the running state is determined.

Then, the control circuit may continue to determine whether the driving circuit is to be switched from the current standby state to the running state. In some embodiments, the control circuit may determine whether the driving circuit is to be switched from the standby state to the running state by detecting whether the host computer performs an operation of delivering image data again.

In some embodiments, in response to detecting that the host computer delivers the image data again, the control circuit may determine whether the driving circuit needs to be woken up. That is, the driving circuit is to be switched from the standby state to the running state. By this time, the control circuit may continue to perform step 604. In comparison, if the control circuit does not detect that the host computer delivers the image data, the control circuit may determine that the driving circuit is not to be woken up. That is, the driving circuit is not to be switched from the standby state to the running state. By this time, the control circuit may continue to perform the detection operation in step 603.

In step 604, the low power consumption mode is exited.

In some embodiments, in response to the control circuit entering the low power consumption mode upon determining that the driving circuit enters the standby state, the control circuit may first exit the low power consumption mode in response to determining that the driving circuit is to be switched from the standby state to the running state.

In step 605, a target reset signal is transmitted to the driving circuit, and an enable signal is transmitted to the first power supply circuit.

In some embodiments, to ensure the stability of switching the driving circuit from the standby state to the running state, in response to exiting the low power consumption mode, the control circuit may first transmit the target reset signal to the driving circuit, and the target reset signal is the same as a reset signal transmitted by the host computer to the driving circuit in response to a coupling being established between the driving circuit and the host computer, to enable the driving circuit to determine that the driving circuit is currently coupled to the host computer again, so as to enable the driving circuit to be reliably and effectively initialized according to a state in which the driving circuit is coupled to the host computer.

Then, the control circuit may further transmit the enable signal to the first power supply circuit, for example, by pulling up the enable pin Power_EN of the first power supply circuit. By this time, the first power supply circuit resumes the power supply to the driving circuit in response to the enable signal, and the driving circuit is woken up and enters a normal running state.

Figure 7:
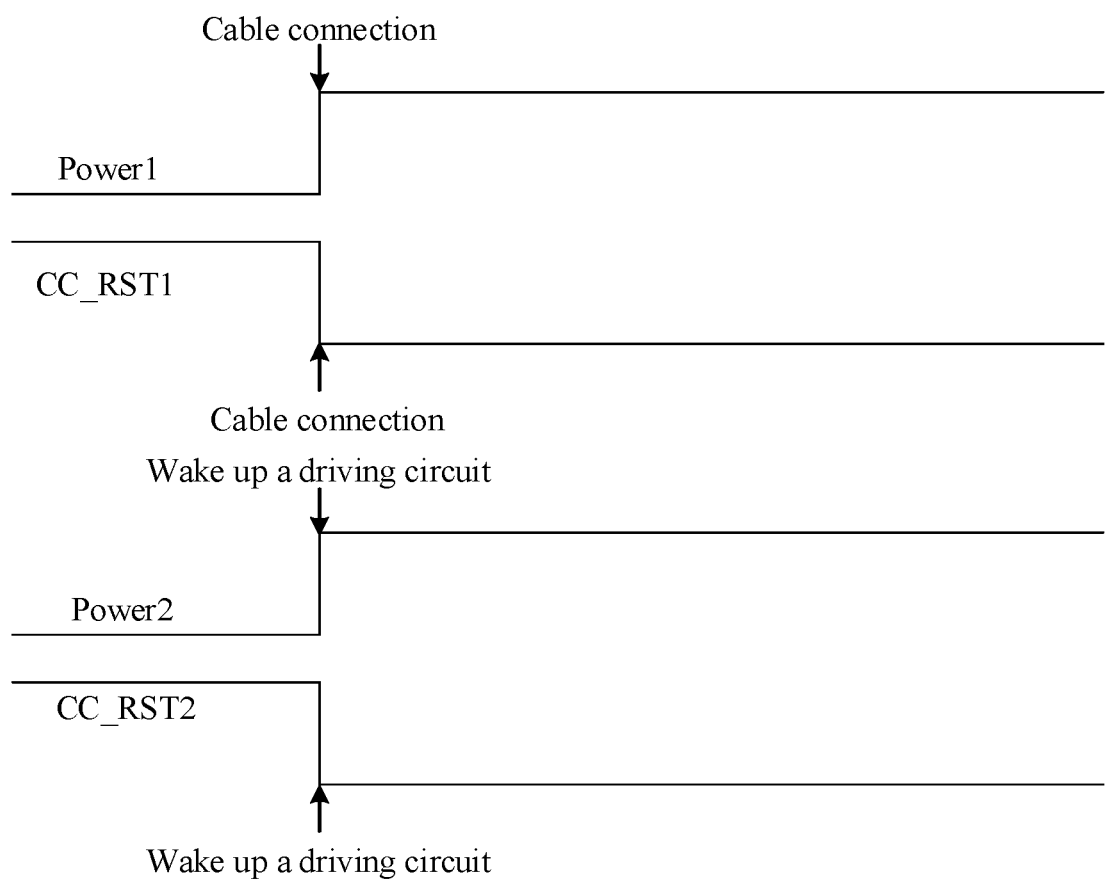
FIG. 7 is a timing diagram of signals according to an embodiment of the present disclosure.

To reflect that the target reset signal is the same as the initial reset signal, FIG. 7 shows the timing of a first power supply signal Power1 and an initial reset signal CC_RST1 received by the driving circuit when the coupling (i.e., a cable connection) is established between the driving circuit and the host computer, and the timing of a first power supply signal Power2 and a target reset signal CC_RST2 received by the driving circuit when the driving circuit is switched from the standby state to the running state (i.e., the driving circuit is woken up) in response to the coupling being established between the driving circuit and the host computer.

As can be seen with reference to FIG. 7, the initial reset signal CC_RST1 and the first power supply signal Power1 jump simultaneously, and the target reset signal CC_RST2 and a second power supply signal Power2 also jump simultaneously. The initial reset signal CC_RST1, the first power supply signal Power1, the target reset signal CC_RST2 and the second power supply signal Power2 have the same timing. It may therefore be determined that the target reset signal transmitted by the control circuit to the driving circuit is the same as the initial reset signal transmitted by the host computer to the driving circuit.

In summary, the embodiment of the present disclosure provides a driving method of a display device. In the method, in response to determining that a driving circuit for driving a display panel to display an image is to be switched from a running state to a standby state, a control circuit stops supplying power to the driving circuit, to ensure that the driving circuit reliably enters the standby state, and the display panel stops displaying the image. In response to determining that the driving circuit is to be switched from the standby state to the running state, the control circuit resumes the power supply to the driving circuit, and transmits a target reset signal to the driving circuit. The target reset signal is the same as a reset signal sent by a host computer to the driving circuit in response to a coupling being established between the driving circuit and the host computer. Therefore, it is ensured that the driving circuit stably enters the running state upon reliable initialization of the driving circuit, and the display panel resumes normal display. In this case, it can be determined that the display device has higher operation stability and lower operating power consumption.

Figure 8:
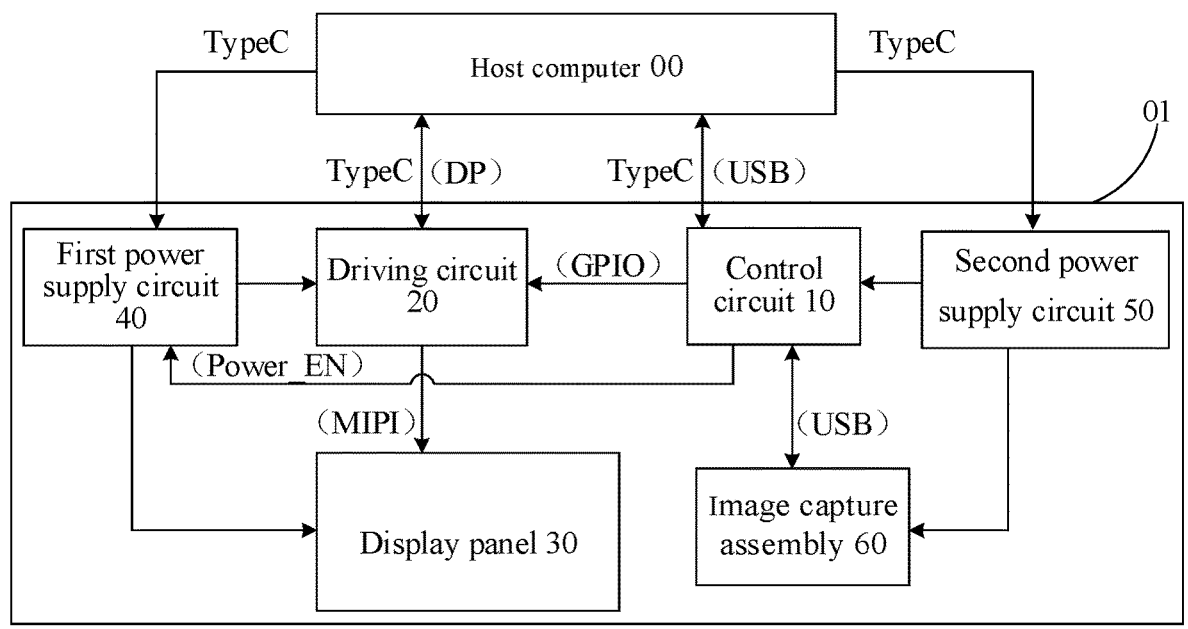
FIG. 8 is a schematic structural diagram of a display system according to an embodiment of the present disclosure.

FIG. 8 is a schematic structural diagram of a display system according to an embodiment of the present disclosure. As shown in FIG. 8, the display system may include a host computer 00 and the display device 01 as shown in any one of FIG. 1 to FIG. 4.

The host computer 00 may be coupled to the driving circuit 20 in the display device 01. The host computer 00 may be configured to deliver image data to the driving circuit 20. In some embodiments, the image data may include first image data and/or second image data.

In some embodiments, still referring to FIG. 8, the host computer 00 according to the embodiment of the present disclosure may be further coupled to the control circuit 10, the first power supply circuit 40 and the second power supply circuit 50 in the display device 01.

The host computer 00 may communicate with the control circuit 10. In this case, the control circuit 10 may perform optional functions implemented in the above embodiment.

The host computer 00 may be further configured to supply an initial power supply signal to the first power supply circuit 40 and the second power supply circuit 50. The first power supply circuit 40 may be configured to generate the first power supply signal based on the initial power supply signal. The second power supply circuit 50 may be configured to generate a second power supply signal based on the initial power supply signal. Then, the first power supply circuit 40 may transmit the first power supply signal to the coupled structures (including the driving circuit 20 and the display panel 30) to supply power to the coupled structures. The second power supply circuit 50 may transmit the second power supply signal to the coupled structures (including the control circuit 10 and the image capture assembly 60) to supply power to the coupled structures.

In some embodiments, the host computer according to the embodiment of the present disclosure may be a mobile phone, or may be another terminal capable of providing image data, such as a PC.

In some embodiments, as shown by the display system in FIG. 8, the host computer 00 may all be coupled to the first power supply circuit 40, the second power supply circuit 50, the control circuit 10 and the driving circuit 20 by a Type C cable. An interface used to couple the host computer 00 and the control circuit 10 may be a universal serial bus (USB) interface. An interface used to couple the host computer 00 and the driving circuit 20 may be a display port (DP). The coupling between the driving circuit 20 and the display panel 30 may be established by a mobile industry processor interface (MIPI). The coupling between the control circuit 10 and the image capture assembly 60 may be established by a USB interface.

It should be noted that in the accompanying drawings, the double arrows represent that the two ends mutually coupled can transmit information to each other, and the single arrows represent that the two ends mutually coupled can only transmit information from one end to the other end to which the arrow points. The embodiment of the present disclosure is not limited to the establishment of the coupling by a coupling cable or an interface, and only a schematic description is provided.

It may be determined based on the description of the display system that the display system may include a main control part, a display part, and an image capture part. The host computer 00 belongs to the main control part, which may be a source of content to be displayed by the display device, may provide calculation support for the display device 01, and in addition may further simultaneously supply power to the display device 01. The driving circuit 20 and the display panel 30 belong to the display part, and the main function is to implement the visualization of the display device 01. The image capture assembly 60 belongs to the image capture part, and is mainly configured to implement an image capture function, to provide original materials for the display device 01 to implement some functions (for example, human face recognition or ranging). The control circuit 10 may belong to the display part or the image capture part.

It should be understood that the terms such as "first" and "second" in the specification and claims of the present disclosure and in the accompanying drawings are merely intended for distinguishing similar objects, but are not intended for description of a specific order or time sequence. It should be understood that the data thus used are interchangeable in appropriate circumstances and can be, for example, implemented in an order other than those illustrated or described in the embodiments of the present disclosure.

The term "and/or" mentioned herein indicates three relationships. For example, A and/or B may indicate the following three cases: Only A exists, both A and B exist, and only B exists. The symbol "/" generally indicates an "OR" relationship between the associated objects.

Described above are merely exemplary embodiments of the present disclosure, and are not intended to limit the present disclosure. Within the spirit and principles of the disclosure, any modifications, equivalent substitutions, improvements, and the like shall be included within the protection scope of the present disclosure.

What is claimed is:

1. A display device, comprising a control circuit, a driving circuit, and a display panel; wherein the control circuit is coupled to the driving circuit, and the control circuit is configured to stop transmitting a first power supply signal to the driving circuit in response to determining that the driving circuit is to be switched from a running state to a standby state, and resume transmitting the first power supply to the driving circuit in response to determining that the driving circuit is to be switched from the standby state to the running state, and transmit a target reset signal to the driving circuit; and the driving circuit is further coupled to the display panel and is configured to be coupled to a host computer, and is configured to be initialized in response to the target reset signal, and drive, based on first image data delivered by the host computer, the display panel to display an image under driving by the first power supply signal;

wherein the target reset signal is the same as an initial reset signal, and the initial reset signal is a signal sent by the host computer to the driving circuit in response to a coupling being established between the driving circuit and the host computer.

2. The display device according to claim 1, further comprising a first power supply circuit; wherein the control circuit is further coupled to the first power supply circuit, and is configured to transmit a disable signal to the first power supply circuit in response to determining that the driving circuit is to be switched from the running state to the standby state, and transmit an enable signal to the first power supply circuit in response to determining that the driving circuit is to be switched from the standby state to the running state; and the first power supply circuit is further coupled to the driving circuit, and is configured to stop transmitting the first power supply signal to the driving circuit in response to the disable signal, and transmit the first power supply signal to the driving circuit in response to the enable signal.

3. The display device according to claim 2, wherein the first power supply circuit is further coupled to the display panel, and the first power supply circuit is further configured to stop transmitting the first power supply signal to the display panel in response to the disable signal, and transmit the first power supply signal to the display panel in response to the enable signal.

4. The display device according to claim 1, wherein the control circuit is further configured to switch to a low power consumption mode in response to determining that the driving circuit is to be switched from the running state to the standby state,
wherein in the low power consumption mode, the control circuit is not in communication with the driving circuit.

5. The display device according to claim 4, wherein the control circuit is further configured to exit the low power consumption mode in response to determining that the driving circuit is to be switched from the standby state to the running state.

6. The display device according to claim 1, wherein the control circuit is further coupled to the host computer; and
the control circuit is further configured to determine that the driving circuit is to be switched from the running state to the standby state in response to detecting that a screen-off duration of the host computer is greater than a duration threshold, and determine that the driving circuit is to be switched from the standby state to the running state in response to detecting that the host computer delivers the first image data again in the standby state.

7. The display device according to claim 1, wherein the control circuit is further configured to be coupled to the host computer; and
the control circuit is further configured to determine that the driving circuit is to be switched from the running state to the standby state in response to detecting a touch operation on a sleep control on the host computer.

8. The display device according to claim 1, wherein the control circuit comprises a general-purpose input/output pin, wherein the control circuit is coupled to the driving circuit by the general-purpose input/output, and the target reset signal is transmitted to the driving circuit.

9. The display device according to claim 1, further comprising a second power supply circuit; wherein
the second power supply circuit is coupled to the control circuit, and is configured to supply a second power supply signal to the control circuit, and the control circuit is configured to operate under driving by the second power supply signal.

10. The display device according to claim 9, further comprising an image capture assembly; wherein
the second power supply circuit is further coupled to the image capture assembly, and is further configured to supply the second power supply signal to the image capture assembly;
the image capture assembly is further coupled to the control circuit, and is configured to capture a second image data driven by the second power supply signal, and transmit the second image data to the driving circuit by the control circuit; and
the driving circuit is configured to drive, based on the first image data and the second image data, the display panel to display an image.

11. The display device according to claim 1, wherein the control circuit is a micro controller unit.

12. The display device according to claim 1, wherein the display device is an augmented reality device.

13. The display device according to claim 3, wherein the control circuit is further configured to switch to a low power consumption mode in response to determining that the driving circuit is to be switched from the running state to the standby state, and exit the low power consumption mode in response to determining that the driving circuit is to be switched from the standby state to the running state, wherein in the low power consumption mode, the control circuit is not in communication with the driving circuit;
the control circuit is further configured to be coupled to the host computer, and is further configured to determine that the driving circuit is to be switched from the running state to the standby state in response to detecting that a screen-off duration of the host computer is greater than a duration threshold, or determine that the driving circuit is to be switched from the running state to the standby state in response to detecting a touch operation on a sleep control on the host computer; and the control circuit is further configured to determine that the driving circuit is to be switched from the standby state to the running state in response to detecting that the host computer delivers the first image data again in the standby state;
the control circuit comprises a general-purpose input/output pin, wherein the control circuit is coupled to the driving circuit by the general-purpose input/output pin, and the target reset signal is transmitted to the driving circuit;
the display device further comprises a second power supply circuit, wherein the second power supply circuit is coupled to the control circuit, and is configured to supply a second power supply signal to the control circuit, and the control circuit is configured to operate under driving by the second power supply signal;
the display device further comprises an image capture assembly; the second power supply circuit is further coupled to the image capture assembly, and is further configured to supply the second power supply signal to the image capture assembly; the image capture assembly is further coupled to the control circuit, and is further configured to capture second image data under driving by the second power supply signal, the second image data being transmitted to the driving circuit by the control circuit; and the driving circuit is configured to drive, based on the first image data and the second image data, the display panel to display an image;
the control circuit is a micro controller unit; and
the display device is an augmented reality device.

14. A driving method of a display device, comprising:
in response to determining that a driving circuit is to be switched from a running state to a standby state, stopping transmitting a first power supply signal to the driving circuit; and
in response to determining that the driving circuit is to be switched from the standby state to the running state, resuming transmitting the first power supply signal to the driving circuit, and transmitting a target reset signal to the driving circuit, wherein the target reset signal is intended to instruct the driving circuit to be initialized, and the first power supply signal is intended to instruct the driving circuit to drive, based on first image data delivered by a host computer, a display panel to display an image;

wherein the target reset signal is the same as an initial reset signal, and the initial reset signal is a signal sent by the host computer to the driving circuit in response to a coupling being established between the driving circuit and the host computer.

15. The method according to claim 14, wherein stopping transmitting the first power supply signal to the driving circuit comprises:

in response to determining that the driving circuit is to be switched from the running state to the standby state, transmitting a disable signal to a first power supply circuit, wherein the disable signal is intended to instruct the first power supply circuit to stop transmitting the first power supply signal to the driving circuit; and resuming transmitting the first power supply signal to the driving circuit comprises:

in response to determining that the driving circuit is to be switched from the standby state to the running state, transmitting an enable signal to the first power supply circuit, wherein the enable signal is intended to instruct the first power supply circuit to transmit the first power supply signal to the driving circuit.

16. The method according to claim 14, further comprising:

in response to determining that the driving circuit is to be switched from the running state to the standby state, upon stopping transmitting the first power supply signal to the driving circuit, switching to a low power consumption mode;

wherein in the low power consumption mode, the control circuit is not in communication with the driving circuit.

17. The method according to claim 16, further comprising:

in response to determining that the driving circuit is to be switched from the standby state to the running state, prior to resuming transmitting the first power supply signal to the driving circuit, exiting the low power consumption mode.

18. A display system, comprising a host computer and a display device, wherein the display device comprises a control circuit, a driving circuit, and a display panel; wherein the host computer is coupled to the driving circuit, and is configured to deliver image data to the driving circuit;

the control circuit is coupled to the driving circuit, and is configured to stop transmitting a first power supply signal to the driving circuit in response to determining that the driving circuit is to be switched from a running state to a standby state, resume transmitting the first power supply signal to the driving circuit in response to determining that the driving circuit is to be switched from the standby state to the running state, and transmit a target reset signal to the driving circuit; and the driving circuit is further coupled to the display panel, and is configured to be initialized in response to the target reset signal, and drive, based on the image data delivered by the host computer, the display panel to display an image under driving by the first power supply signal;

wherein the target reset signal is the same as an initial reset signal, and the initial reset signal is a signal sent by the host computer to the driving circuit in response to a coupling being established between the driving circuit and the host computer.

19. The system according to claim 18, wherein the display device further comprises a control circuit, a first power supply circuit, and a second power supply circuit; wherein wherein the host computer is further coupled to the control circuit, the first power supply circuit and the second power supply circuit, and is in communication with the control circuit to supply an initial power supply signal to the first power supply circuit and the second power supply circuit; and the first power supply circuit is configured to generate the first power supply signal based on the initial power supply signal, and the second power supply circuit is configured to generate a second power supply signal based on the initial power supply signal.

20. The system according to claim 18, wherein the host computer is a mobile phone.

* * * * *